United States Patent [19] [11] Patent Number: 5,070,842
Inoue et al. [45] Date of Patent: Dec. 10, 1991

[54] APPARATUS FOR CONTROLLING IGNITION TIMING IN INTERNAL COMBUSTION ENGINE

[75] Inventors: Noriyuki Inoue; Satoru Ohkubo; Toshio Iwata; Akira Demizu, all of Hyogo, Japan

[73] Assignee: Mitsubishi Denki Kabushiki Kaisha, Tokyo, Japan

[21] Appl. No.: 552,811

[22] Filed: Jul. 16, 1990

[30] Foreign Application Priority Data

Jul. 19, 1989 [JP] Japan .................................. 1-186661
Jul. 19, 1989 [JP] Japan .................................. 1-186662

[51] Int. Cl.⁵ .............................................. F02P 5/04
[52] U.S. Cl. .................................................... 123/425
[58] Field of Search .................................. 123/425, 435

[56] References Cited

U.S. PATENT DOCUMENTS 4,896,642  1/1990  Washino et al. .................. 123/425
4,951,630  8/1990  Iwata ................................. 123/425
4,966,117  10/1990  Kawamura ....................... 123/425

FOREIGN PATENT DOCUMENTS 0059060  4/1982  Japan .
0059061  4/1982  Japan .
0107826  6/1983  Japan .................................. 123/435
0018268  1/1984  Japan .................................. 123/425
0018269  1/1984  Japan .................................. 123/425

Primary Examiner—Tony M. Argenbright
Assistant Examiner—Robert E. Mates
Attorney, Agent, or Firm—Wolf, Greenfield & Sacks

[57] ABSTRACT

An apparatus for controlling ignition timing in an internal combustion engine wherein the ignition timing is controlled such that a crank angle at which an increasd rate of pressure in a cylinder is maximized coincides with a target value. e.g., an MBT point or the like. The apparatus detects an occurrence of incorrect ignition in response to a signal indicative of pressure in the cylinder and inhibits feedback control from being carried out for the ignition timing when an occurrence of incorrect ignition is detected. The rank angle, at which an increased rate of pressure in the cylinder is maximized, is calculated in response to a signal indicative of pressure in the cylinder, a reference pulse transmitted from a crank angle sensor and a pulse transmitted per 1° of a crank angle of the crankshaft. The target value is set to a value by which a maximum torque is obtainable within a range where no knocking occurs.

14 Claims, 10 Drawing Sheets

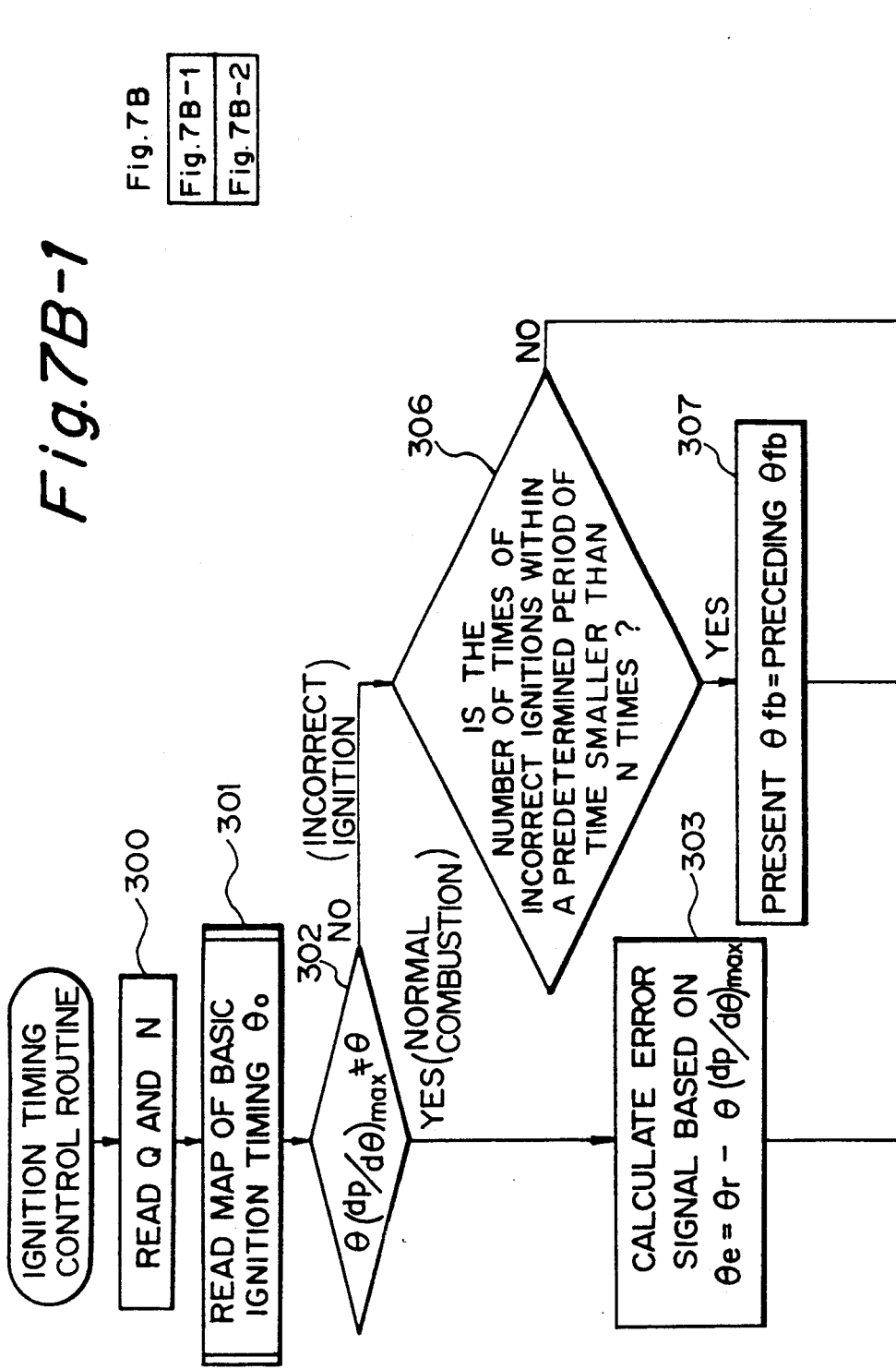

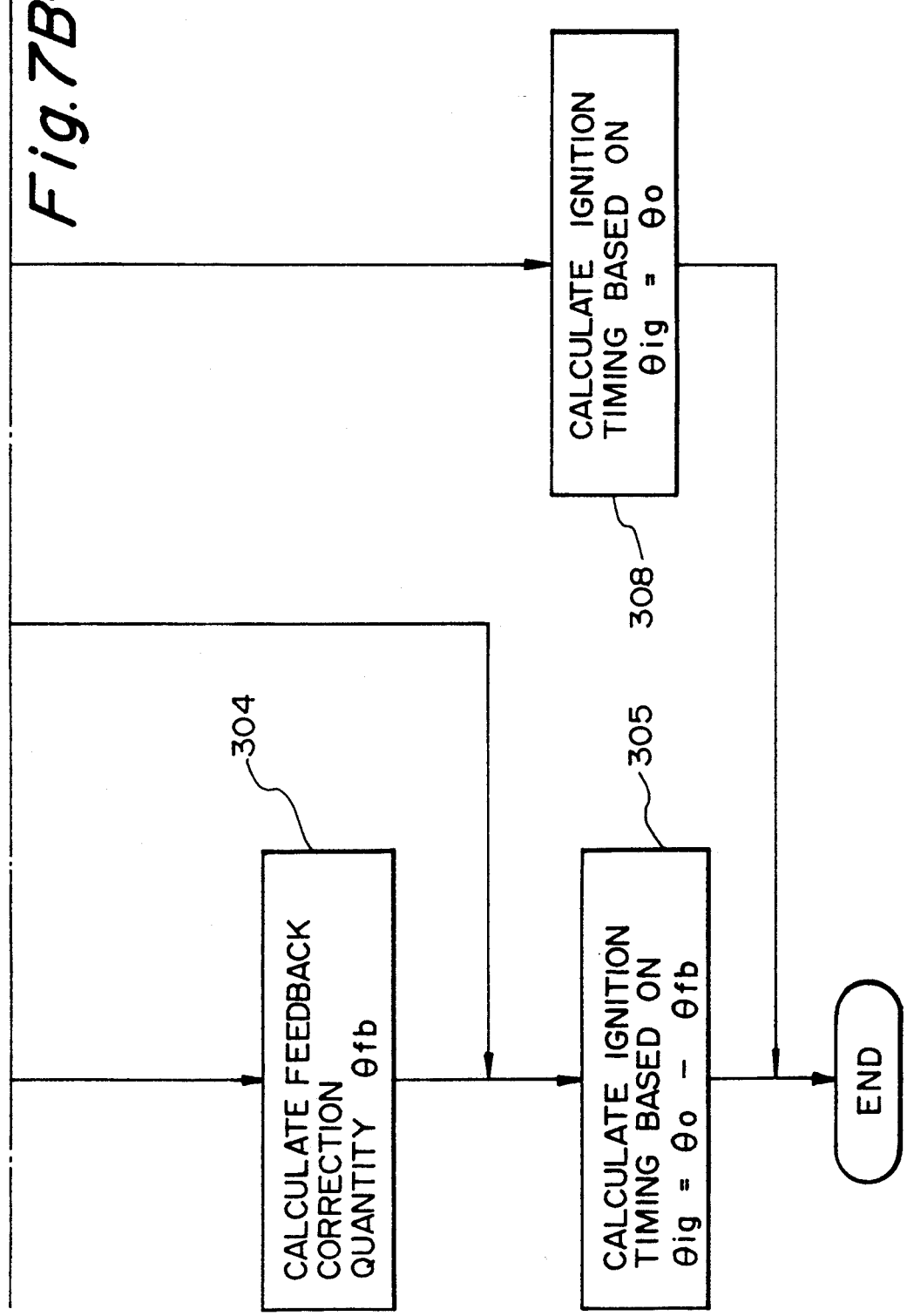

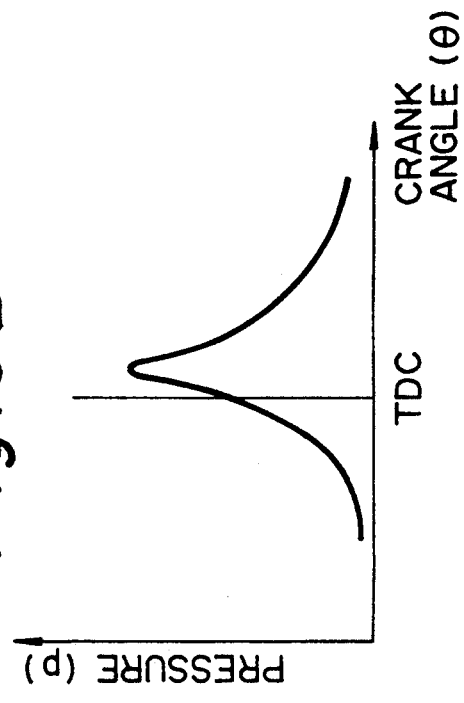
Fig.9A
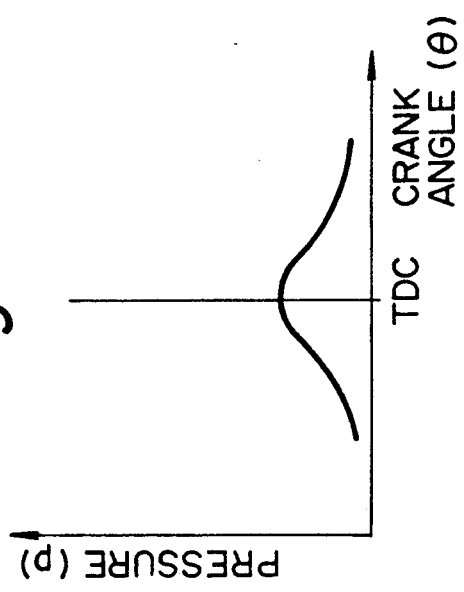
Fig.9B
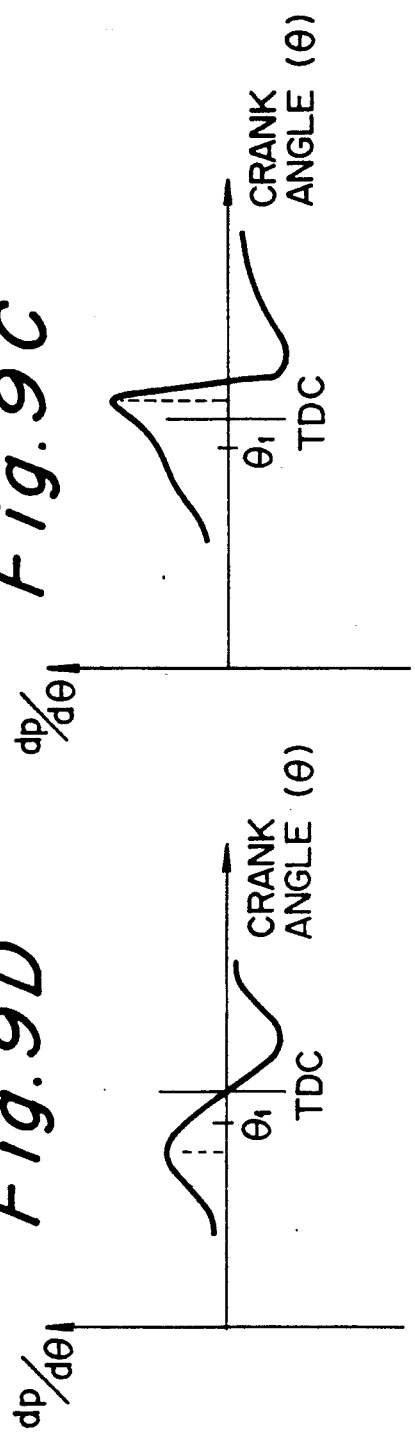
Fig.9C
Fig.9D

APPARATUS FOR CONTROLLING IGNITION TIMING IN INTERNAL COMBUSTION ENGINE

BACKGROUND OF THE INVENTION

1. Field of the Invention

The present invention relates to an apparatus for controlling ignition timing in an internal combustion engine.

2. Description of the Prior Art

A typical conventional apparatus for controlling ignition timing in an internal combustion engine is disclosed, e.g., in official gazettes of Japanese Patent Disclosure No. 59060/1982 and Japanese Patent Disclosure No. 59061/1982. FIG. 8 is a sectional view of an internal combustion engine for which the conventional apparatus is employed wherein the whole structure of the apparatus is schematically illustrated in the drawing. In the drawing, reference numeral 1 designates an air cleaner, reference numeral 2 designates an air flow meter for measuring a quantity of intake air, reference numeral 3 designates a throttle valve, reference numeral 4 designates an intake air manifold, reference numeral 5 designates a cylinder, reference numeral 6 designates a coolant temperature sensor for detecting the temperature of a coolant flowing through the engine, reference numeral 7 designates a crank angle sensor, reference numeral 8 designates an exhaust gas manifold, reference numeral 9 designates an exhaust gas sensor, reference numeral 10 designates an injector, reference numeral 11 designates an ignition plug, reference numeral 12 designates a controller and reference numeral 13 designates an igniter.

With the conventional apparatus as constructed in the above-described manner, the crank angle sensor 7 outputs to the controller 12 a reference position indicative pulse per each reference position for a crank angle of the crankshaft (e.g., per 180° in the case of a four-cylinder type internal combustion engine; per 120° in the case of a six-cylinder type internal combustion engine). In addition, the crank angle sensor 7 outputs to the controller 12 a unit pulse per unit crank angle of the crankshaft. After the controller 12 has the reference position indicative pulse inputted thereinto, it calculates the number of inputted unit angle indicative pulses to determine the present crank angle of the crankshaft. Further, the controller 12 can determine the present engine speed by measuring a frequency or a period of the unit angle pulse. Incidentally, the crank angle sensor 7 is normally mounted in a distributor.

The controller 12 is normally constituted in the form of a microcomputer including, e.g., CPU, RAM, ROM, an input/output interface and so forth. An intake air quantity indicative signal S1 transmitted from the air flow meter 2, a coolant temperature indicative signal S2 transmitted from the coolant temperature sensor 6, a crank angle indicative signal S3 transmitted from the crank angle sensor 7, an air/fuel ratio indicative signal S4 transmitted from the exhaust gas sensor 9 and a signal (not shown) indicative of a fully closed state of the throttle valve 3 are inputted into the controller 12, respectively. In response to these signals, the controller 12 performs calculations to calculate an ignition timing and a quantity of fuel to be injected. Subsequently, the controller 12 outputs an ignition signal to the igniter 13 such that ignition occurs at the calculated ignition timing. After the ignition plug 11 is activated, the controller 12 outputs a driving signal S5 to drive the injector 10 with a predetermined air/fuel ratio.

To correctly calculate the ignition timing, a basic ignition timing corresponding to an engine speed N and an intake air quantity Q is previously stored in the controller 12. When the engine starts, the controller 12 reads the engine speed N and the intake air quantity Q and then determines a quantity of correction to be made by performing addition or multiplication in consideration of the temperature of a coolant and other factors, whereby a desirable ignition timing is obtained.

With the conventional apparatus as described above, however, it has been found that the apparatus has a problem that the controller cannot carry out ignition timing control at which a maximum torque is obtainable, if a point representative of minimum advance for best torque (hereinafter referred to as an MBT point) at the time when an ignition timing map is set is different from an MBT point at the time of practical usage, because engine characteristics vary as time elapses and a certain amount of productive fluctuation unavoidably occurs with the apparatus.

SUMMARY OF THE INVENTION

The present invention has been made with the foregoing background in mind.

An object of the present invention is to provide an apparatus for controlling ignition timing in an internal combustion engine wherein ignition timing control can always automatically be carried out with a maximum torque being obtainable, irrespective of how far engine characteristics vary as time elapses or of how much productive fluctuation occurs with the apparatus.

To accomplish the above object, there is provided according to one aspect of the present invention an apparatus for controlling ignition timing in an internal combustion engine, wherein the apparatus comprises means for detecting an increased rate of pressure in a cylinder, means for detecting a crank angle of a crankshaft for the internal combustion engine, means for calculating a crank angle at which an increased rate of pressure in a cylinder is maximized in response to inputting a signal transmitted from the means for detecting an increased rate of pressure in the cylinder as well as inputting a signal transmitted from the means for detecting a crank angle of the crankshaft, means for averaging values derived from the calculations, and means for comparing a value so derived with a target value to control the ignition timing such that a differential value between the averaged value and the target value is eliminated.

Further, according to another aspect of the present invention, there is provided an apparatus for controlling ignition timing in an internal combustion engine, wherein the apparatus comprises means for detecting pressure in a cylinder, means for detecting a crank angle of a crankshaft for the internal combustion engine, means for calculating a crank angle of the crankshaft at which an increased rate of pressure in the cylinder is maximized in response to inputting a signal transmitted from the means for detecting pressure in the cylinder as well as inputting a signal transmitted from the means for detecting a crank angle of the crankshaft, means for detecting an occurrence of incorrect ignition in response to a signal indicative of pressure in the cylinder, means for comparing a value derived from the calculation with a target value to control the ignition timing such that a differential value between the averaged value and the target value is eliminated, and means for inhibiting feedback control from being carried out for the ignition timing when an occurrence of incorrect ignition is detected.

With the apparatus of the present invention, a controller calculates a crank angle of the crankshaft at which an increased rate of pressure in the cylinder is maximized and carries out feedback control for the ignition timing such that the calculated crank angle coincides with a preset target value. When an occurrence of incorrect ignition is detected, the controller inhibits any feedback control from being carried out.

Other objects, features and advantages of the present invention will become readily apparent from reading of the following description which has been made with reference to the accompanying drawings.

BRIEF DESCRIPTION OF THE DRAWINGS

The present invention is illustrated in the following drawings in which:

FIGS. 7(A), 7(B), 7(B-1), and 7(B-2) are a flowchart for the apparatus of the present invention for controlling ignition timing in an internal combustion engine, respectively;

FIGS. 9(A) to (D) are a characteristic diagram illustrating that pressure in the cylinder varies at the time of normal combustion as well as at the time of incorrect ignition, respectively.

DESCRIPTION OF THE PREFERRED EMBODIMENT

Now, the present invention will be described in detail hereinafter with reference to the accompanying drawings which illustrate a preferred embodiment thereof.

Figure 1:
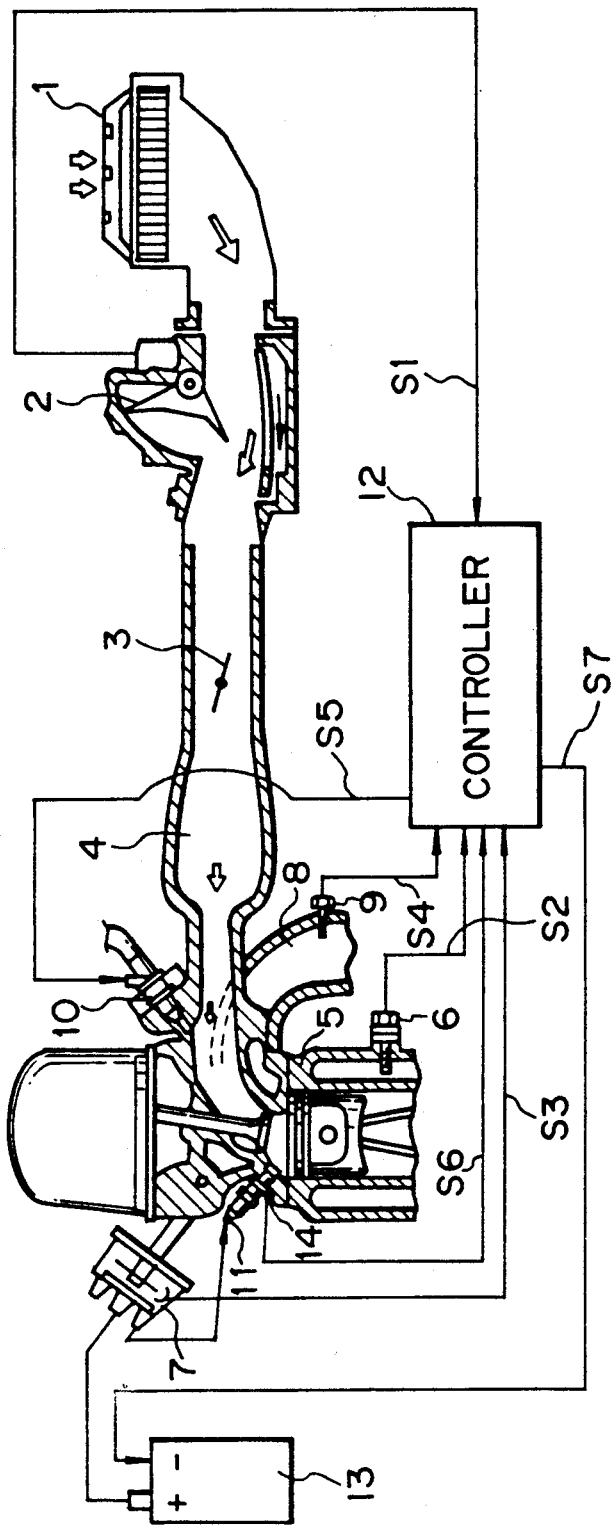
FIG. 1 is a sectional view of an internal combustion engine for which an apparatus for controlling ignition timing in the internal combustion engine in accordance with an embodiment of the present invention is employed.

FIG. 1 is a sectional view of an internal combustion engine for which an ignition control apparatus for the internal combustion engine in accordance with the embodiment of the present invention is employed. Essential components represented by reference numerals 1 to 13 are identical to those of the conventional apparatus as described above. Therefore, they are represented by the same reference numerals. Thus, repeated description in them will not be required. In the drawing, reference numeral 14 designates a pressure sensor for detecting a pressure in the cylinder 5. The pressure sensor 14 is practically used in place of the washer for the ignition plug 11 so as to allow variation of the pressure in the cylinder 5 to be picked up in the form of an electrical signal. The controller 12 is constructed such that an intake air quantity indication signal S1 transmitted from the air flow meter 2, a coolant temperature indication signal S2 transmitted from the coolant temperature sensor 6, a crank angle indication signal S3 transmitted from the crank angle sensor 7, an air/fuel ratio indication signal S4 transmitted from the exhaust gas sensor 9, a pressure indication signal S6 transmitted from the pressure sensor 14 and a signal (not shown) indicative of a fully closed state of the throttle valve 3 are inputted into the controller 12, respectively. In response to the aforementioned signals, the controller 12 performs calculations for calculating ignition timing and then outputs the ignition signal S7 to the igniter 13 to activate the ignition plug 11 based on results derived from the calculations, whereby ignition occurs with the calculated ignition timing.

Figure 2A:
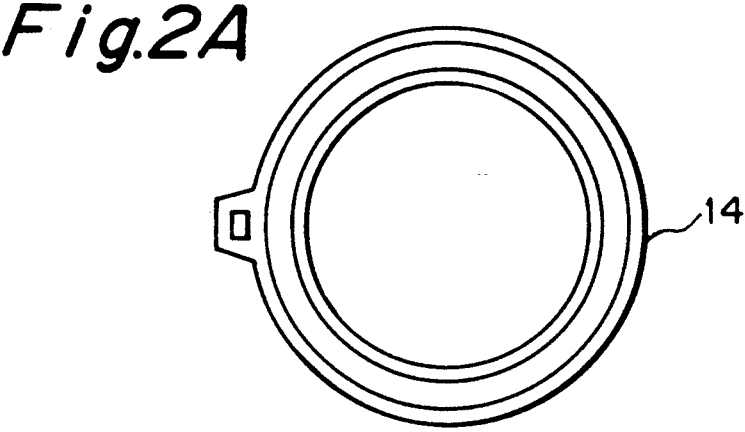
FIG. 2(A) is a plan view of a pressure sensor for the apparatus.
Figure 2B:
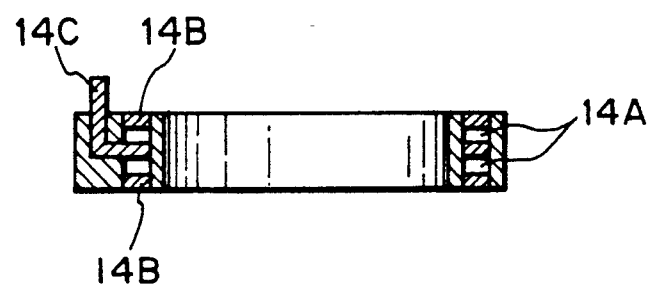
FIG. 2(B) is a vertical sectional view of the pressure sensor in FIG. 2(A)
Figure 3:
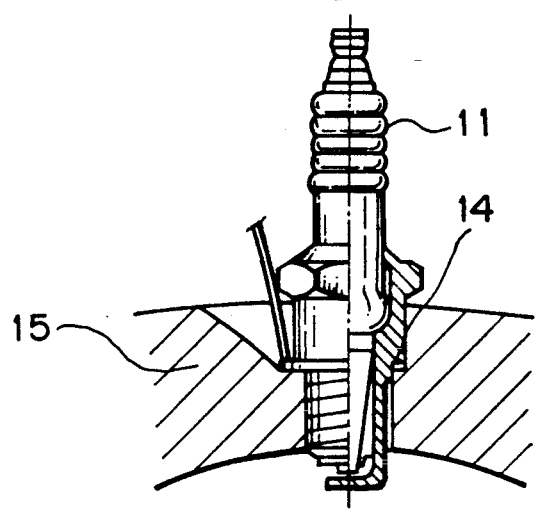
FIG. 3 is a fragmentary sectional view illustrating the pressure sensor shown in FIGS. 2(A) and (B) is mounted on a cylinder.

FIG. 2(A) is a plan view of the pressure sensor 14 and FIG. 2(B) is a vertical sectional view of the pressure sensor 14. In the drawings, reference numeral 14A designates a piezoelectric element, reference numeral 14B designates a minus electrode and reference numeral 14C designates a plus electrode. FIG. 3 is a fragmentary sectional view illustrating that the pressure sensor 14 is mounted on a cylinder 15 by threadably tightening the ignition plug 11.

Figure 4:
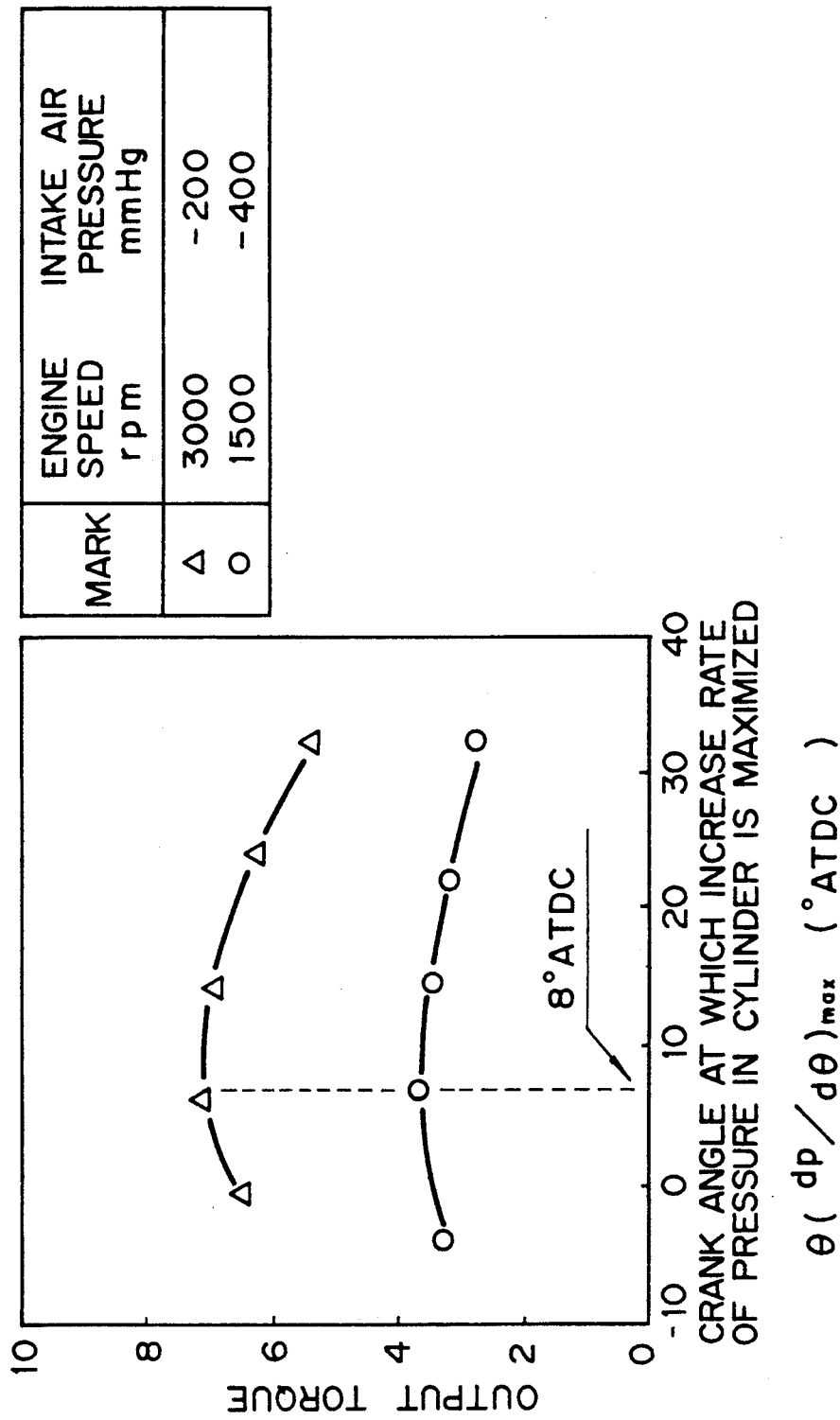
FIG. 4 is a characteristic diagram illustrating a relationship between a crank angle of a crankshaft at which an increased rate of pressure in the cylinder is maximized and an output torque from the internal combustion engine for which the apparatus of the present invention is employed.

FIG. 4 is a characteristic diagram illustrating a relationship between a crank angle $\theta(dP/d\theta)_{max}$ and an output torque generated by the internal combustion engine wherein the crank angle $\theta(dP/d\theta)_{max}$ represents a crank angle of the crankshaft at which an increased rate of pressure in the cylinder 5 per 1° of a crank angle of the crankshaft is maximized. In the drawing, a characteristic curve identified by a plurality of ∆ marks represents a case where the internal combustion engine operates under conditions of an engine speed of 3000 rpm and an intake air pressure of 200 mmHg, whereas a characteristic curve identified by a plurality of ○ marks represents a case where the internal combustion engine operates under conditions of an engine speed of 1500 rpm and an intake air pressure of 400 mmHg. As is apparent from the drawing, the crank angle $\theta(dP/d\theta)_{max}$ having a maximized engine output torque is kept substantially constant independently of the present load and engine speed. In the example, the crank angle $\theta(dP/d\theta)_{max}$ having a maximized engine output torque is located at a position represented by ATDC 8° in FIG. 4. The crank angle $\theta(dP/d\theta)_{max}$ having a maximized engine output torque is hereinafter referred to as $\theta$ MBT.

Figure 5:
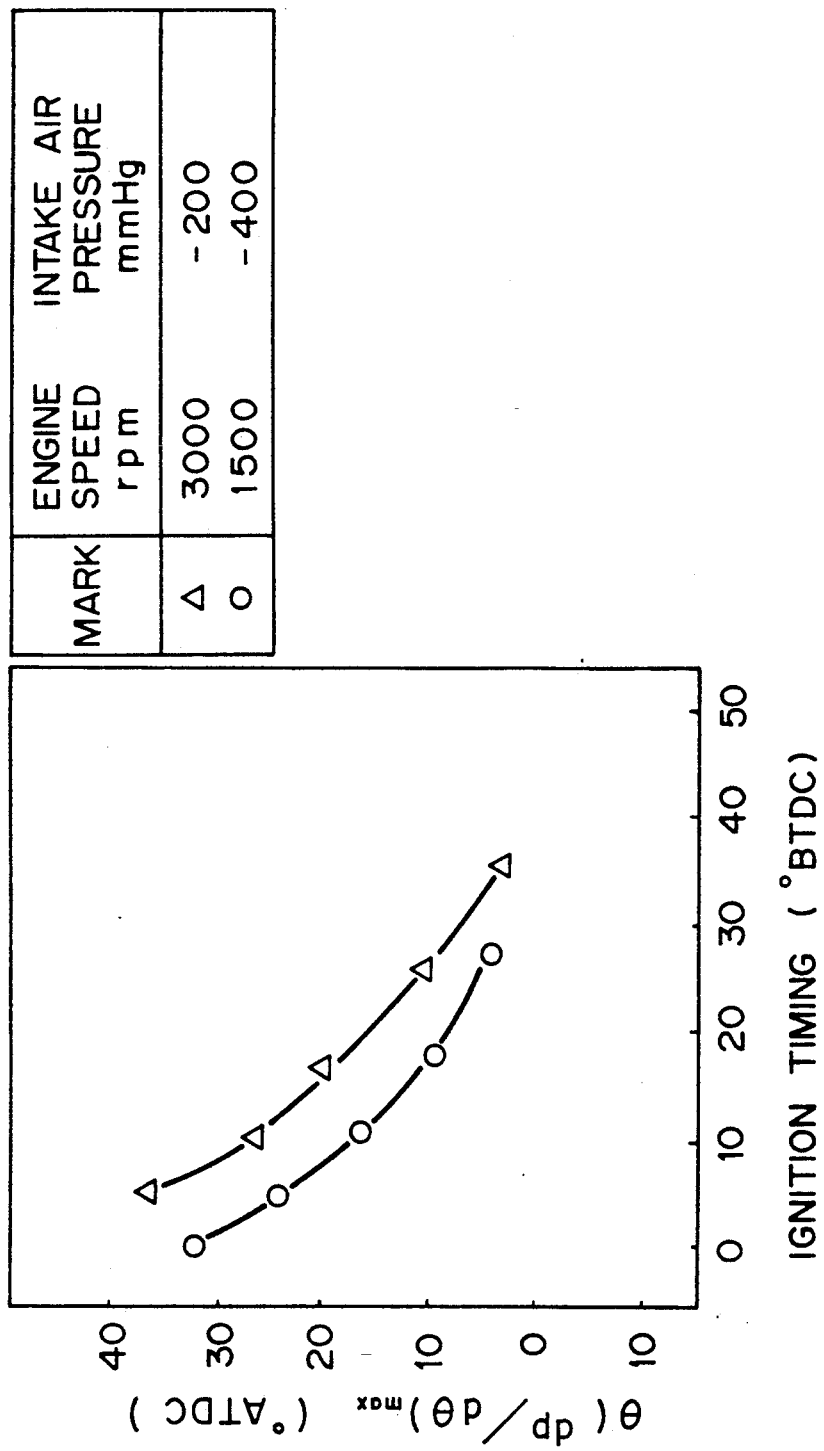
FIG. 5 is a characteristic diagram illustrating a relationship between an ignition timing and a crank angle of the crankshaft at which an increased rate of pressure in the cylinder is maximized.

FIG. 5 is a characteristic diagram illustrating a relationship between the ignition timing and the $\theta(dP/d\theta)_{max}$. As is apparent from the drawing, the ignition timing is associated with the $\theta(dP/d\theta)_{max}$ in the corresponding relationship relative to the latter. Thus, the $\theta(dP/d\theta)_{max}$ can correctly be controlled by controlling the ignition timing.

In a case where the igniter 13 malfunctions or a combustible gas mixture is incorrectly generated, incorrect ignition occurs. At this time, the pressure in the cylinder exhibits a wave form as shown in FIG. 9(B), and the crank angle of the crankshaft having a pressure increased rate maximized largely shifts to the advance angle side compared with the case shown in FIG. 9(A). Thus, an occurrence of incorrect ignition can be detected by setting a specific crank angle position $\theta_1$ for determining an occurrence of incorrect ignition between $\theta(dP/d\theta)_{max}$ at the time of normal combustion and $\theta(dP/d\theta)_{max}$ at the time of incorrect ignition and then comparing the crank angle position $\theta_1$ with the $\theta(dP/d\theta)_{max}$ derived from practical measurements.

As will be apparent from the above description, it can be known that a maximum torque is always obtained by controlling the ignition timing such that the $\theta(dP/d\theta)_{max}$ becomes $\theta$ MBT. In addition, it can be known that incorrect ignition occurs, if the $\theta(dP/d\theta)_{max}$ does not remain within a predetermined crank angle range.

Figure 6:
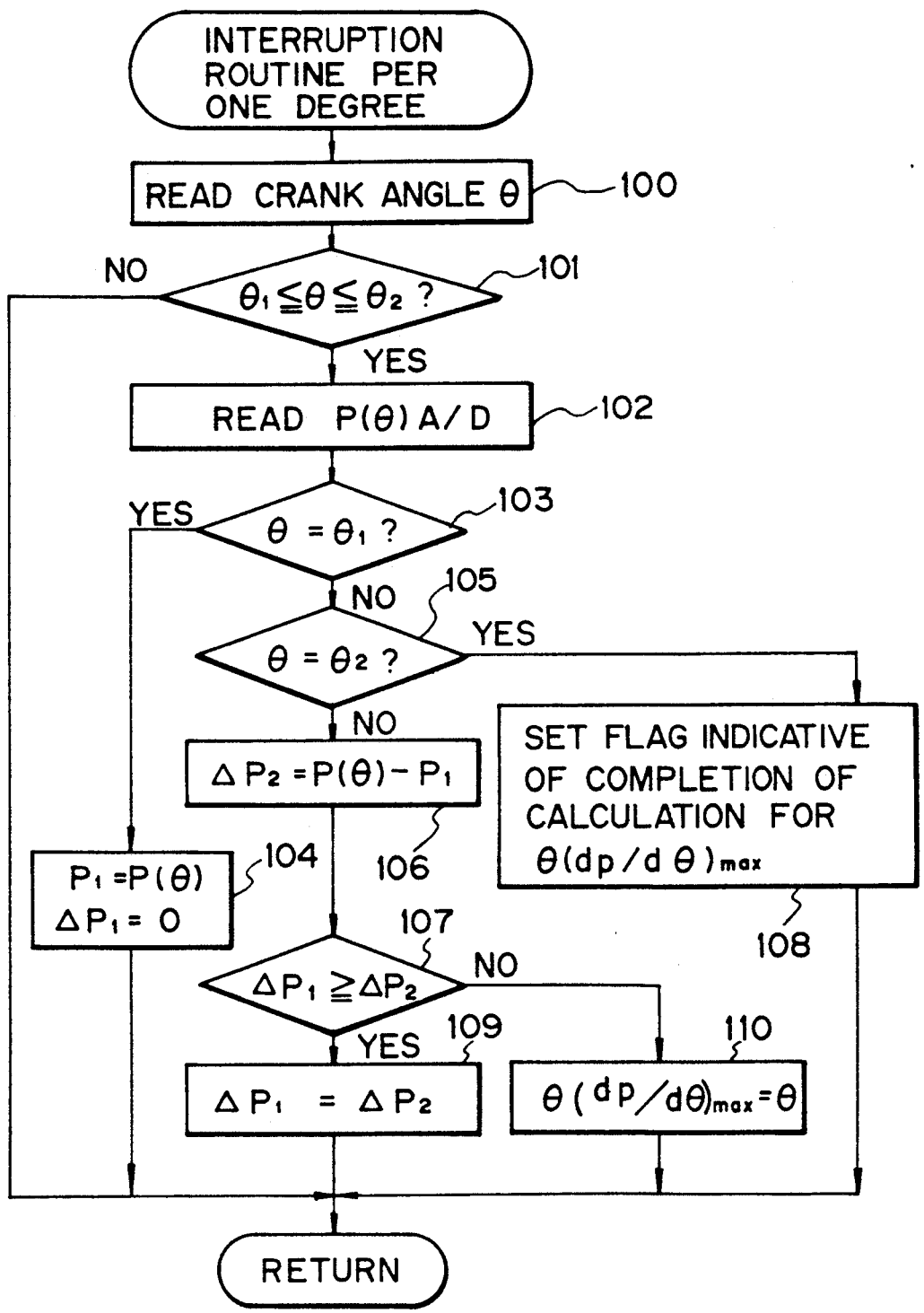
FIG. 6 is a flow chart for the apparatus of the present invention for obtaining a crank angle of the crankshaft at which an increased rate of pressure in the cylinder is maximized.

Next, a process for obtaining the $\theta(dP/d\theta)_{max}$ will be described below with reference to a flowchart in FIG. 6. This flowchart illustrates an interruption routine which is executed in response to a pulse transmitted from the crank angle sensor 7 per 1° of the crank angle of the crankshaft. When the routine starts, it first enters a step 100 at which the controller 12 obtains a crank angle $\theta$ by calculating the number of pulses per 1° of the crank angle of the crankshaft after a reference pulse is inputted into the controller 12. Then, the routine moves to a step 101 at which the controller 12 determines whether or not the crank angle $\theta$ obtained at the step 100 remains within the range from the crank angle $\theta_1$ for detecting an occurrence of incorrect ignition to an angle $\theta_2$ located behind a combustion TDC (wherein the angle $\theta_2$ is preset in consideration of the range where the $\theta(dP/d\theta)_{max}$ can be assumed arbitrarily). If the result derived from the determination at the step 101 is YES, the routine moves to a step 102 at which the controller 12 reads an A/D value indicative of the pressure $P(\theta)$ in the cylinder 5. Subsequently, the routine moves to a step 103. If the result derived from the step 101 is NO, the main routine is re-established. At the step 103, the controller 12 determines whether the crank angle $\theta$ is an angle of $\theta_1$ or not. If the result derived from the determination at the step 103 reveals that the crank angle $\theta$ is $\theta_1$, the routine moves to a step 104 at which the controller 12 calculates equations of $P_1 = P(\theta)$ and $\Delta P_1 = 0$ using the A/D values representative of the pressure $P(\theta)$ in the cylinder 5 so that the results derived from the calculations of the both equations of $P_1 = P(\theta)$ and $\Delta P_1 = 0$ are stored in a memory of the controller 12. Then, the main routine is re-established. If the result derived from the determination at the step 103 reveals that the crank angle $\theta$ is not $\theta_1$, the routine moves to a step 105 at which the controller 12 determines whether the crank angle $\theta$ is an angel of $\theta_2$ or not. If the result derived from the determination at the step 105 reveals that the crank angle $\theta$ is not $\theta_2$, the routine moves to a step 106 at which the controller 12 calculates an equation of $\Delta P_2 = P(\theta) - P_1$ so that the result derived from the calculation of the foregoing equation is stored in the memory. Then, the routine moves to a step 107. If the result derived from the determination at the step 105 reveals that the crank angle $\theta$ is $\theta_2$, the routine moves to a step 108 at which the controller 12 shows a flag indicative of completion of the calculation of $\theta(dP/d\theta)_{max}$. Then, the main routine is re-established. At the step 107, the controller 12 determines whether or not $\Delta P_2$ is equal to $\Delta P_1$ or $\Delta P_2$ is larger than $\Delta P_1$. If the result derived from the determination at the step 107 is YES, the routine moves to a step 109 at which the controller 12 updates the content of $\Delta P_1$ under a condition that $\Delta P_1$ is equal to $\Delta P_2$. Then, the main routine is re-established. If the result derived from the determination at the step 107 is NO, the controller 12 determines that the pressure increased rate has been maximized. Subsequently, the routine moves to a step 110 at which the controller 12 calculates an equation of $\theta(dP/d\theta)_{max} = \theta$ so that the result derived from the foregoing equation is stored in the memory. Then, the main routine is re-established. Consequently, the crank angle $\theta(dP/d\theta)_{max}$, at which an increased rate of pressure in the cylinder 5 per 1° of the crank angle of the crankshaft is maximized within the range from the predetermined crank angle $\theta_1$ for detecting an occurrence of incorrect ignition to the crank angle $\theta_2$ located behind the combustion TDC, can be obtained by processing the aforementioned steps.

Figure 7A:
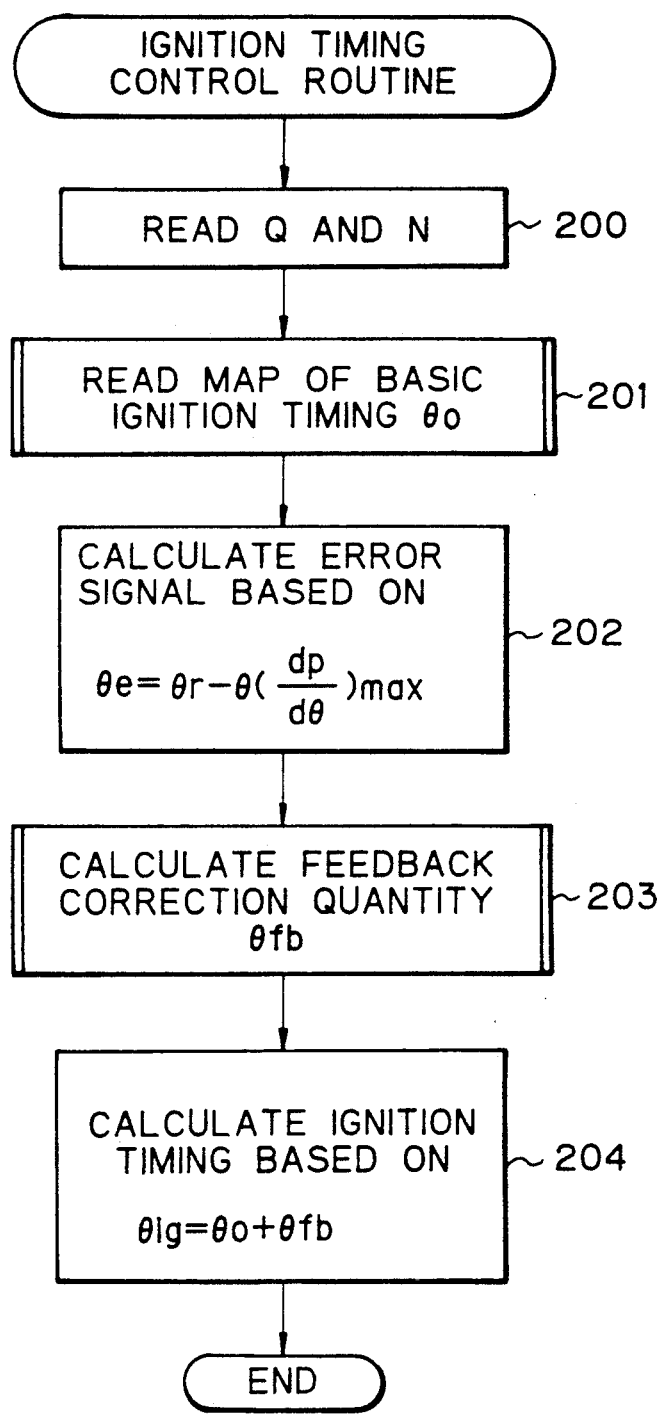
Figure 8:
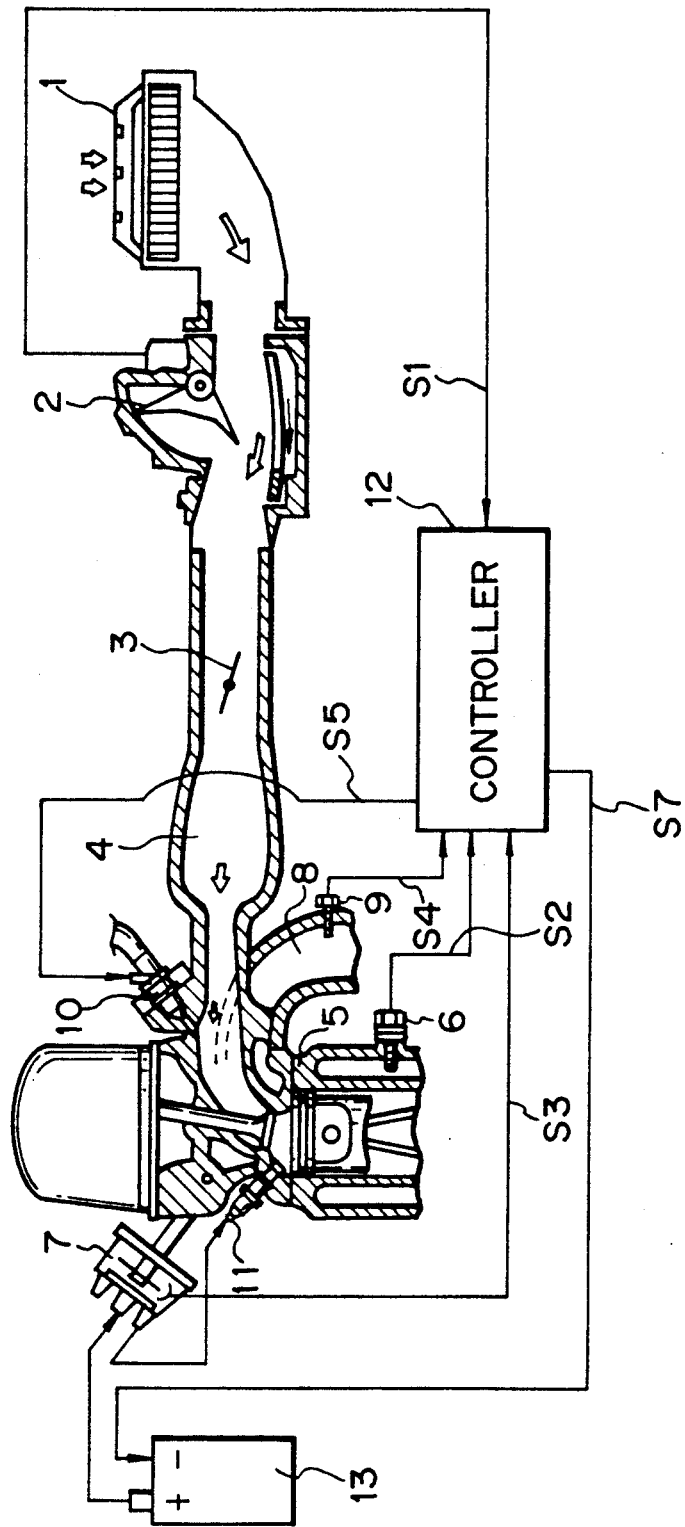
FIG. 8 is a sectional view of an internal combustion engine for which a conventional apparatus for controlling ignition timing in an internal combustion engine is employed.

Next, control for an ignition timing with the use of $\theta(dP/d\theta)_{max}$ will be described below with reference to a flowchart in FIG. 7(A). The flow shown in FIG. 7(A) is a flow to be executed at every time when the $\theta(dP/d\theta)_{max}$ is obtained in accordance with the flow in FIG. 6 and the controller 12 shows a flag indicative of completion of the calculation of the $\theta(dP/d\theta)_{max}$. At a step 200, the controller 12 reads an engine speed N and a quantity of intake air Q. Then, the routine moves to a step 201 at which the controller 12 reads a previously stored basic ignition timing map with reference to N and Q to obtain a basic ignition timing $\theta_o$. Subsequently, the routine moves to a step 202 at which the controller 12 calculates an error signal required for carrying out feedback control and represented by an equation of $\theta_e = \theta_r - \theta(dP/d\theta)_{max}$ (a target value $\theta_r$ of the $\theta(dP/d\theta)_{max}$ is usually preset to a value of the $\theta$ MBT) and then shows a flag indicative of completion of the calculation. Thereafter, the routine moves to a step 203 at which the controller 12 performs proportional integrating calculation for the error signal $\theta_e$ thereby to calculate a quantity of feedback correction $\theta_{fb}$. Subsequently, the routine moves to a step 204 at which the controller 12 obtains a final ignition timing $\theta_{ig}$ in the form of a sum of the basic ignition timing $\theta_o$ read from the foregoing map and the quantity of feedback correction $\theta_{fb}$. At this time, the controller 12 outputs the ignition signal S7 to the igniter 13 such that ignition occurs at the final ignition timing $\theta_{ig}$. Thus, the ignition plug 11 is activated to ignite a combustible mixture gas.

Next, control for an ignition timing with the use of $\theta(dP/d\theta)_{max}$ will be described below with reference to a flowchart in FIG. 7(B). The flow shown in FIG. 7(B) is a flow to be executed at every time when the $\theta(dP/d\theta)_{max}$ is obtained in accordance with the flow in FIG. 6 and then the controller 12 shows a flag representative of completion of the calculation of the $\theta(dP/d\theta)_{max}$. At a step 300, the controller 12 reads an engine speed N and a quantity of intake air Q. Then, the routine moves to a step 301 at which the controller 12 reads a previously stored basic ignition timing map with reference to N and Q to obtain a basic ignition timing $\theta_o$. Thereafter, the routine moves to a step 302 at which the controller 12 determines whether the $\theta(dP/d\theta)_{max}$ which has been calculated in accordance with the flowchart in FIG. 6 is $\theta_1$ or not. If the result derived from the determination at the step 302 reveals that the $\theta(dP/d\theta)_{max}$ is $\theta_1$, this means that the $\theta(dP/d\theta)_{max}$ is located on the advance angle side ahead of the $\theta_1$. The controller 12 determines that incorrect ignition occurs. Subsequently, the routine moves to a step 306. If the result derived from the determination at the step 302 is not $\theta_1$, the controller 12 determines that normal combustion takes place, and the routine moves to a step 303. At the step 303, the controller 12 calculates an error signal required for carrying out feedback control and represented by an equation of $\theta_e = \theta_r - \theta(dP/d\theta)_{max}$ (a target value $\theta_r$ of the $\theta(dP/d\theta)_{max}$ is preset to a value of the $\theta$ MBT) and then resets a flag representative of completion of the calculation of the $\theta(dP/d\theta)_{max}$. At a step 304, the controller 12 performs a proportional integrating calculation for the error signal $\theta_e$ to calculate a quantity of feedback correction $\theta_{fb}$. Then, the routine moves to a step 305 at which the controller 12 obtains a final ignition timing $\theta_{ig}$ in the form of a difference between the basic ignition timing $\theta_o$ read from the foregoing map and the quantity of feedback control $\theta_{fb}$. The controller 12 outputs the ignition timing signal S7 to the igniter 13 such that ignition occurs at a final ignition timing $\theta_{ig}$. Thus, the ignition plug 11 is activated to ignite a combustible mixture gas. On the other hand, at a step 306, the controller 12 determines whether the number of times of incorrect ignitions within a predetermined period of time is smaller than a specific number n of times or not. This determination is intended to determine whether the foregoing incorrect ignition is single incorrect ignition due to a contingent phenomenon or it is frequent incorrect ignition attributable to other factors. In the former case, the controller 12 determines that the number of times of incorrect ignitions is smaller than the number n of times. Subsequently, the routine moves to a step 307 at which the controller 12 does not introduce the $\theta_e$ derived from the $\theta(dP/d\theta)_{max}$ into the present quantity of feedback correction $\theta_{fb}$ but carries out feedback control using the present $\theta_{fb}$. In a case where the controller 12 has determined at the step 306 that the number of times of incorrect ignitions is larger than the number n of times, the routine moves to a step 308 at which the controller 12 stops feedback control and calculates the ignition timing $\theta_{ig}$ based on the basic ignition timing $\theta_o$ which has been read at the step 301.

In the embodiment shown in FIG. 7(A) and FIG. 7(B), $dP/d\theta$ representative of a value per unit crank angle of the crankshaft is used as an increased rate of pressure in the cylinder 5. Alternatively, $dP/dt$ representative of a value per unit time may be substituted for the $dP/d\theta$ to carry out same control. This is due to the fact that, since a relationship represented by an equation of $\theta = 6Nt$ is established among a crank angle $\theta$, an engine speed N and a time t (wherein $\theta$ is represented by degree, N is represented by rpm and t is represented by second), an equation of $d\theta = 6Ndt$ is established, unless the engine speed N varies, and the $(dP/d\theta)_{max}$ becomes equal to $(dP/dt)_{max}/(6N)$, whereby the $(dP/dt)_{max}$ can be used in place of the $(dP/d\theta)_{max}$.

In addition, the present invention has been described above with respect to a case where the crank angle $\theta(dP/dt)_{max}$ at which a maximum increase in the rate of pressure in the cylinder 5 is obtainable in accordance with the program flow. However, the present invention should not be limited only to this case. For example, the $\theta(dP/d\theta)_{max}$ may be obtained by using circuits, e.g., a peak value holding circuit depending on the differential wave form representative of pressure in the cylinder. In the embodiment shown, a target control value $\theta_r$ for the $\theta(dP/d\theta)_{max}$ has been set to a value with which the maximum torque is obtainable. In some cases, however, there arises a problem that the target control value $\theta_r$ remains within the knocking region under a condition of a large magnitude of load. In view of this problem, the target value $\theta_r$ may be preset to a certain value as a map within the range where no knocking occurs such that the maximum torque is obtainable at the foregoing value. In this case, the controller 12 may read the target value $\theta_r$ depending on the engine speed N, the intake air quantity Q and so forth.

Further, the present invention has been described above with respect to the case where an absolute value indicative of the pressure in the cylinder 5 can be measured. It is obvious that the present invention is more preferably employable in a case where a rate of variation of the pressure can be measured.

As will be apparent from the above description, according to the present invention, the controller operates such that it calculates a crank angle $\theta(dP/d\theta)_{max}$ at which an increased rate of pressure in the cylinder is maximized, compares a value derived from the calculation with a target value thereby to control an ignition timing such that a difference between the calculated value and the target value is eliminated and moreover inhibits feedback control from being carried out at the time of incorrect ignition. Therefore, the apparatus of the present invention can automatically control ignition timing at all times such that ignition occurs when the maximum torque is obtainable, irrespective of how far the ignition timing varies as time elapses or irrespective of how much productive fluctuation occurs within the apparatus.

While the present invention has been described above with respect to a single preferred embodiment thereof, it should of course be understood that the present invention should not limited only to this embodiment but various changes or modifications may be made without departure from the scope of the invention as defined by the appended claims.

What is claimed is:

1. An apparatus for controlling ignition timing in an internal combustion engine wherein a piston is operatively connected to a crankshaft, said piston being slidably accommodated in a cylinder to define a combustion chamber in said cylinder, and a combustible mixture gas comprising fuel and combustion air is ignited by an ignition plug disposed in said combustion chamber, wherein said apparatus comprises:

means for detecting pressure in the cylinder of the internal combustion engine;

means for detecting a crank angle of the crankshaft of the internal combustion engine;

means for calculating a crank angle of the crankshaft at which an increased rate of pressure in the cylinder is maximized in response to a pressure indicative signal transmitted from said means for detecting pressure in the cylinder as well as a signal transmitted from said means for detecting a crank angle of the crankshaft;

means for averaging values derived from the calculation carried out by said means for calculating said crank angle of the crankshaft; and means for comparing values derived from said averaging with a target value to thereby control ignition timing such that a differential value between said averaged value and said target value is eliminated.

2. The apparatus as claimed in claim 1, wherein said means for calculating a crank angle of the crankshaft at which an increased rate of pressure in the cylinder is maximized serves to derive a crank angle of the crankshaft at which a quantity of increasing pressure in the cylinder per unit crank angle is maximized, within a predetermined crank angle range in response to a pulse transmitted from a crank angle sensor per unit crank angle of the crankshaft as well as a pressure indicative signal transmitted from said means for detecting pressure in the cylinder.

3. The apparatus as claimed in claim 1, wherein said means for calculating a crank angle of the crankshaft at which an increased rate of pressure in the cylinder is maximized serves to derive a crank angle of the crankshaft at which a quantity of increasing of pressure in the cylinder per unit time is maximized, within a predetermined crank angle range in response to a pulse transmitted from a crank angle sensor per unit time as well as a pressure indicative signal transmitted from said means for detecting pressure in the cylinder.

4. The apparatus as claimed in any one of claims 1 to 3, wherein said means for detecting pressure in the cylinder of the internal combustion engine comprises a pressure sensor disposed between the ignition plug and the cylinder to detect a variation in the pressure in the cylinder in the form of a pressure indicative signal, said means for detecting a crank angle of the crankshaft of the internal combustion engine comprises a crank angle sensor for generating a reference position indicative pulse per each reference position for a crank angle of the crankshaft and moreover generating a unit pulse per each unit crank angle of the crankshaft, and said target value represents an MBT point.

5. The apparatus as claimed in any one of claims 1 to 3, wherein said means for detecting pressure in the cylinder of the internal combustion engine comprises a pressure sensor disposed between the ignition plug and the cylinder to detect a variation in the pressure in the cylinder in the form of an electrical signal, said means for detecting a crank angle of the crankshaft of the internal combustion engine comprises a crank angle sensor for generating a reference position indicative pulse per each reference position for a crank angle of the crankshaft and moreover generating a unit pulse per each unit crank angle of the crankshaft, and said target value is set to a value by which a maximum torque is obtainable within a range where no knocking occurs.

6. An apparatus for controlling ignition timing in an internal combustion engine wherein a piston is operatively connected to a crankshaft, said piston being slidably accommodated in a cylinder to define a combustion chamber in said cylinder, and a combustible mixture gas comprising fuel and combustion air is ignited by an ignition plug disposed in said combustion chamber, wherein said apparatus comprises:

means for detecting pressure in the cylinder of the internal combustion engine;

means for detecting a crank angle of the crankshaft of the internal combustion engine;

means for calculating a crank angle $\theta(dP/d\theta)_{max}$ at which an increased rate of pressure in the cylinder is maximized in response to a pressure indicative signal transmitted from said means for detecting pressure in the cylinder as well as a signal transmitted from said means for detecting a crank angle of the crankshaft;

means for deriving a basic ignition timing $\theta_o$ based on an engine speed, a quantity of intake air and a previously stored basic ignition timing map;

means for calculating a difference $\theta_e$ between a target value $\theta_r$ and said crank angle $\theta(dP/d\theta)_{max}$;

means for calculating a feedback correcting quantity $\theta_{fb}$ by carrying out proportional integrating calculation with said difference $\theta_e$;

means for deriving a sum of said basic ignition timing $\theta_o$ and said feedback correcting quantity $\theta_{fb}$ as a final ignition timing $\theta_{ig}$; and means for outputting an ignition signal such that ignition occurs at said final ignition timing $\theta_{ig}$.

7. An apparatus for controlling ignition timing in an internal combustion engine wherein a piston is operatively connected to a crankshaft, said piston being slidably accommodated in a cylinder to define a combustion chamber in said cylinder, and a combustible mixture gas comprising fuel and combustion air is ignited by an ignition plug disposed in said combustion chamber, wherein said apparatus comprises:

means for detecting pressure in the cylinder of the internal combustion engine;

means for detecting a crank angle of the crankshaft of the internal combustion engine;

means for calculating a crank angle of the crankshaft at which an increased rate of pressure in the cylinder is maximized in response to a pressure indicative signal transmitted from said means for detecting pressure in the cylinder as well as a signal transmitted from said means for detecting a crank angle of the crankshaft;

means for comparing a value derived from said calculation with a target value thereby to control an ignition timing such that a differential value between said value derived from the calculation and said target value is eliminated; and means for prohibiting feedback control from being carried out for said ignition timing when an occurrence of incorrect ignition is detected.

8. An apparatus for controlling ignition timing in an internal combustion engine wherein a piston is operatively connected to a crankshaft, said piston being slidably accommodated in a cylinder to define a combustion chamber in said cylinder, and a combustible mixture gas comprising fuel and combustion air is ignited by an ignition plug disposed in said combustion chamber, wherein said apparatus comprises:

means for detecting pressure in the cylinder of the internal combustion engine;

means for detecting a crank angle of the crankshaft of the internal combustion engine;

means for calculating a crank angle of the crankshaft at which an increased rate of pressure in the cylinder is maximized in response to a pressure indicative signal transmitted from said means for detecting pressure in the cylinder as well as a signal transmitted from said means for detecting a crank angle of the crankshaft;

means for detecting an occurrence of incorrect ignition in response to a signal indicative of pressure in the cylinder;

means for determining whether the number of incorrect ignitions within a predetermined period of time is smaller than a predetermined number of times or not;

means for comparing a value derived from said calculation with a target value thereby to control ignition timing such that a differential value between said value derived from the calculation and said target value is eliminated; and means for carrying out feedback control based on a quantity of the preceding feedback control when the number of incorrect ignitions is smaller than a predetermined number and moreover inhibiting feedback control from being carried out for the ignition timing when a plurality of incorrect ignitions, the number of which is in excess of said predetermined number, are detected.

9. The apparatus as claimed in claim 8, wherein said means for calculating a crank angle of the crankshaft at which an increased rate of pressure in the cylinder is maximized serves to derive a crank angle of the crankshaft at which a quantity of increasing pressure in the cylinder per unit crank angle is maximized, within a predetermined crank angle range in response to a pulse transmitted from a crank angle sensor per unit crank angle as well as a pressure indicative signal transmitted from said means for detecting pressure in the cylinder.

10. The apparatus as claimed in claim 8, wherein said means for calculating a crank angle of the crankshaft at which an increased rate of pressure in the cylinder is maximized serves to derive a crank angle of the crankshaft at which a quantity of increasing of pressure in the cylinder per unit time, within a predetermined crank angle range in response to a pulse transmitted from a crank angle sensor per unit time as well as a pressure indicative signal transmitted from said means for detecting pressure in the cylinder.

11. The apparatus as claimed in any one of claims 7 to 10, wherein said means for detecting pressure in the cylinder of the internal combustion engine comprises a pressure sensor disposed between the ignition plug and the cylinder to detect a variation in the pressure in the cylinder in the form of a pressure indicative signal, said means for detecting a crank angle of the crankshaft of the internal combustion engine comprises a crank angle sensor for generating a reference position indicative pulse per each reference position for a crank angle of the crankshaft and moreover generating a unit pulse per unit crank angle of the crankshaft, and said target value represents an MBT point.

12. The apparatus as claimed in any one of claims 7 to 10, wherein said means for detecting pressure in the cylinder of the internal combustion engine comprises a pressure sensor disposed between the ignition plug and the cylinder to detect a variation in the pressure in the cylinder in the form of an electrical signal, said means for detecting a crank angle of the crankshaft of the internal combustion engine comprises a crank angle sensor for generating a reference position indicative pulse per each reference position for a crank angle of the crankshaft and moreover generating a unit pulse per each unit crank angle of the crankshaft, and said target value is set to a value by which a maximum torque is obtainable within a range where no knocking occurs.

13. The apparatus as claimed in claim 1, wherein said means for calculating a crank angle of the crankshaft at which an increased rate of pressure in the cylinder is maximized, serves to derive a crank angle of the crankshaft at which a quantity of increasing pressure in the cylinder per unit crank angle is maximized, within a predetermined crank angle range in response to a pressure indicative signal transmitted from said means for detecting pressure in the cylinder, as well as a pulse transmitted from said means for detecting a crank angle of the crankshaft per unit crank angle of the crankshaft.

14. The apparatus as claimed in claim 8, wherein said means for calculating a crank angle of the crankshaft at which an increased rate of pressure in the cylinder is maximized, serves to derive a crank angle of the crankshaft at which a quantity of increasing pressure in the cylinder per unit crank angle is maximized, within a predetermined crank angle range in response to a pressure indicative signal transmitted from said means for detecting pressure in the cylinder, as well as a pulse transmitted from said means for detecting a crank angle of the crankshaft per unit crank angle of the crankshaft.

* * * * *